Sept. 1, 1953　　　J. M. DONALSON　　　2,650,978
MEANS FOR SUPPORTING METAL CLIPS
Filed Nov. 8, 1950
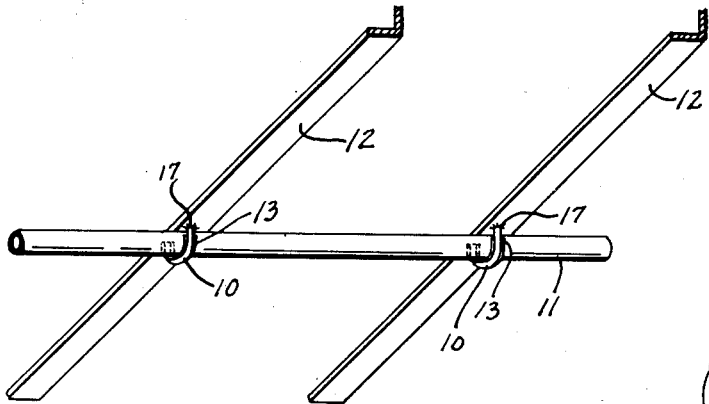
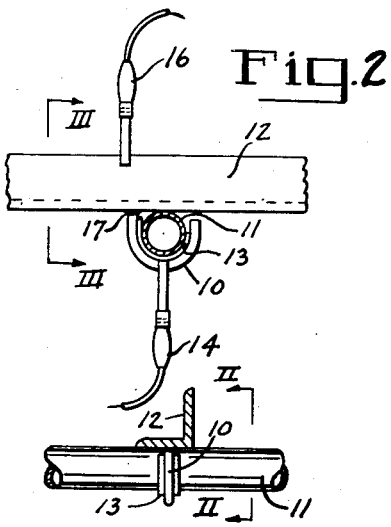
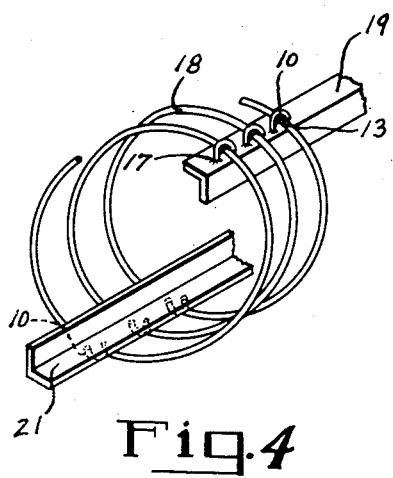
INVENTOR.
JOHN M. DONALSON
BY
ATTORNEYS Patented Sept. 1, 1953

2,650,978

UNITED STATES PATENT OFFICE 2,650,978

MEANS FOR SUPPORTING METAL CLIPS

John M. Donalson, Birmingham, Ala.

Application November 8, 1950, Serial No. 194,623

4 Claims. (Cl. 219—10)

This invention relates to means for supporting a metal member such as a pipe, rod, bars and the like from a metal surface and has for one of its objects the provision of a supporting clip which may be welded directly to the metal surface with the member in place.

A further object is to provide a supporting clip which shall be particularly adapted for securing a metal conduit to metal girders, beams or the like.

A still further object is to provide a clip of the character designated which is simple of construction and economical of manufacture and one which is easily flash welded to the metal surface with the metal member to be supported in position.

Heretofore, in the art to which my invention relates, metal conduits, rods and the like have been secured to metal surfaces by first welding a threaded stud to the metal surface and then securing the pipe to the metal surface by means of a clamp and bolt. I have devised a clip which may be secured to the metal surface with the conduit in place thus eliminating the necessity of a threaded stud and nut. This is accomplished by placing a suitable insulating material on the inner surface of the clip. One electrode of the electric welding machine is connected to the clip and the other electrode is grounded to the metal surface to which the clip is to be secured. The clip is then placed over the conduit, or the like, and is flash welded to the metal surface.

I have found my improved clip to be particularly adapted for securing metal conduits such, as conduits of a sprinkler system, to metal beams or girders. Also the clips are satisfactory in every respect for securing spiral rods to spacer members for erecting concrete columns or for concrete pile construction. This method of securing the spiral rods to spacer members is particularly desirable since it is not practicable to weld the spiral rods directly to the spacer members in the shop. It is customary to flatten the spiral before shipping and if the spiral rods were welded to the spacer members in the shop they would likely become separated therefrom due to twisting and turning of the spiral rods while being handled. By providing a clip which permits the rod to turn with respect to the spacer members the spiral rod may be conveniently secured to the spacer members in the shop.

A device embodying features of my invention is illustrated in the accompanying drawing forming a part of this application in which:

Fig. 1 is a perspective view of the clip supporting a tubular member;

Fig. 2 is a sectional view of the device taken along the line II—II of Fig. 3 showing the electrodes of the welding machine in place for flash welding the clip to a metal surface with a tubular member in place;

Fig. 3 is a sectional view taken along the line III—III of Fig. 2; and

Fig. 4 is a perspective view of the clip securing a spiral rod to spacer members.

Referring now to the drawings for a better understanding of my invention, I show a J-shaped clip member 10 securing a tubular member 11 to a metal surface, such as an angle iron 12. A suitable insulating material 13 is placed between the clip member 10 and the tubular member 11. An electrode 14 of an electric welding machine, not shown, is connected to the J-shaped clip member 10 and the other electrode 16 of the electric welding machine is grounded to the metal surface 12. The clip member 10 is then flash welded to the metal surface 12 as at 17. The purpose of the insulating material 13 is to prevent the electric current from passing directly from the clip member to the tubular member 11. Any suitable insulating material 13 may be secured or applied to the inner surface of the clip member 10, or may be inserted between the clip member and the rod, conduit, or the like at the time of flash welding the clip member to the metal surface 12.

In Fig. 4 of the drawings, I show the clip member 10 securing a spiral rod 18 to spacer members 19 and 21 for concrete column and concrete pile constructions. The clip member 10 is welded directly to the spacer members 19 and 21 by placing the insulating material 13 between the spiral rod 18 and the clip member. One electrode of the electric welding machine is connected to the clip 10 and the other electrode is connected to the member 19 or 21 as the case may be. The clip is then flash welded to the spacer member with the spiral rod in place.

From the foregoing it will be seen that I have provided an improved clip for securing metal conduits, rods or the like to a metal surface. By providing a clip which may be welded directly to the metal surface without the necessity of a threaded stud and bolt, I have greatly reduced the cost of production. Also, the labor required to secure the clip to a metal surface is greatly reduced as there are no parts to assemble. The worker merely attaches one electrode of the electric welder to the J-shaped clip and grounds the other electrode to the metal surface to which the clip is to be secured and flash welds the clip to the surface.

While I have shown my invention in but one form, it will be obvious to those skilled in the art that it is not so limited, but is susceptible of various changes and modifications without departing from the spirit thereof, and I desire therefore, that only such limitations shall be placed thereupon as are specifically set forth in the appended claims:

What I claim is:

1. The method of supporting an electrically conductive member from an electrically conductive surface with an electrically conductive clip of a shape to partially encircle said member and be in direct contact with said surface comprising the steps of insulating said clip from said member, and passing a welding current through the clip and said surface thereby welding the clip to said surface with said member in situ.

2. The method of securing an elongated metallic member to an electrically conductive surface with a metallic clip of a shape to support said elongated member comprising the steps of forming an assembly of said surface, said elongated member and said clip with the clip in direct contact with the surface and supporting the elongated member, positioning an insulating material between the clip and the elongated member, and passing a welding current through the clip and said surface thereby welding the clip to said surface with the elongated member in situ.

3. The method of securing a metallic spiral rod having a plurality of turns to a metal member extending transversely across the turns of said spiral rod with a plurality of metallic clips, each clip being of a shape to partially encircle said spiral rod and be in direct contact with said metal member comprising the steps of insulating each clip from said spiral rod and passing a welding current through the metallic clips and said metal member, thereby welding the clips to said member with the spiral rod in situ.

4. The method of supporting a metallic tube-like member from a metallic surface with a J-shaped metallic clip member comprising the steps of forming an assembly of said surface, said tube-like member and said clip with the clip partially encircling the tube-like member and being in direct contact with said surface, insulating said clip from the tube-like member, and passing a welding current through the clip and said surface thereby welding the clip to said surface with the metallic tube-like member in situ.

JOHN M. DONALSON.

References Cited in the file of this patent

UNITED STATES PATENTS

| Number | Name | Date |
|---|---|---|
| 1,233,181 | Burns | July 10, 1917 |
| 2,221,934 | Ferris | Nov. 19, 1940 |
| 2,246,579 | Ewertz | June 24, 1941 |
| 2,299,143 | Hellwig | Oct. 20, 1942 |
| 2,338,006 | Morehouse | Dec. 28, 1943 |
| 2,445,481 | Wertz | July 20, 1948 |
| 2,473,634 | Brown | June 21, 1949 |
| 2,550,512 | Woolrich | Apr. 24, 1951 |